United States Patent
Chien

(10) Patent No.: US 7,274,836 B1
(45) Date of Patent: Sep. 25, 2007

(54) OPTICAL MODULE USING A LINEAR SENSOR FOR IDENTIFYING IMAGES

(75) Inventor: Mao-Hsiung Chien, Hsin-Chu Hsien (TW)

(73) Assignee: PixArt Imaging Inc., Hsin-Chu Hsien (TW)

( * ) Notice: Subject to any disclaimer, the term of this patent is extended or adjusted under 35 U.S.C. 154(b) by 0 days.

(21) Appl. No.: 11/470,626

(22) Filed: Sep. 7, 2006

(30) Foreign Application Priority Data

May 18, 2006 (TW) .............................. 95117657 A

(51) Int. Cl.
- *G02B 6/00* (2006.01)
- *G06K 9/00* (2006.01)
- *G06K 5/00* (2006.01)
- *G06K 9/74* (2006.01)

(52) U.S. Cl. .......................... 385/12; 385/14; 385/31; 385/36; 385/129; 385/88; 385/92; 382/124; 382/126; 382/127; 250/556; 356/71

(58) Field of Classification Search ................ 385/14, 385/31, 37, 36, 12, 129, 130, 131, 132, 88, 385/89, 92; 382/124, 126, 127; 250/556; 356/71

See application file for complete search history.

(56) References Cited

U.S. PATENT DOCUMENTS

| 4,784,484 | A  | * | 11/1988 | Jensen .......................... 356/71 |
| 5,619,586 | A  | * | 4/1997  | Sibbald ....................... 382/127 |
| 5,812,252 | A  | * | 9/1998  | Bowker et al. ................ 356/71 |
| 6,259,108 | B1 | * | 7/2001  | Antonelli et al. ........... 250/556 |
| 6,355,937 | B2 | * | 3/2002  | Antonelli et al. ........... 250/556 |
| 2004/0179722 | A1 | * | 9/2004 | Moritoki et al. ............ 382/124 |

* cited by examiner

*Primary Examiner*—Brian M. Healy
(74) *Attorney, Agent, or Firm*—Winston Hsu

(57) ABSTRACT

An optical module using a linear sensor for identifying images includes a circuit board, a linear sensor installed on the circuit board, a light source set installed on the circuit board, and an optical element. The optical element includes a first plane, a second plane paralleling the first plane, wherein a distance between the second plane and the circuit board is shorter than a distance between the first plane and the circuit board, a first total reflection plane between the first plane and the second plane, for totally reflecting light provided by the light source set, and a second total reflection plane between the first plane and the second plane, for totally reflecting reflected light of the first total reflection plane to the linear sensor.

14 Claims, 6 Drawing Sheets

OPTICAL MODULE USING A LINEAR SENSOR FOR IDENTIFYING IMAGES

BACKGROUND OF THE INVENTION

1. Field of the Invention

The present invention provides an optical module, and more particularly, an optical module using a linear sensor for identifying images.

2. Description of the Prior Art

Fingerprint identification systems have been widely used in fields of personal identification, safe deposits, vehicles, entrance systems, automatic teller machines, network security systems, etc. A prior art identification system checks a user's status based on an card, while the fingerprint identification systems is based on fingerprints, so that the fingerprint identification systems can increase security of personal identification.

Please refer to FIG. 1, which illustrates a schematic diagram of a prior art optical module 1 of a fingerprint identification system. The optical module 1 includes a light source 12, a sensor 14, a reflector 18, a prism 16, and a circuit board 10. The light source 12 and the sensor 14 are installed on the circuit board 10.

When a user puts a fingerprint on a position shown in FIG. 1, the light source 12 emits light through the prism 16 to the fingerprint. Then, the prism 16 totally reflects reflection of the fingerprint to the reflector 18 for reflecting the reflection of the fingerprint to the sensor 14, so as to sense the fingerprint.

The optical module 1 must use two optical elements, one is reflector 18, and the other is the prism 16. Owing to placement of the optical elements, the optical module 1 cannot be utilized in small electronic devices, such as mobile phones, and is not facile to be fabricated.

SUMMARY OF THE INVENTION

It is therefore a primary objective of the claimed invention to provide an optical module using a linear sensor for identifying images.

According to the claimed invention, an optical module using a linear sensor for identifying images comprises a circuit board, a linear sensor installed on the circuit board, a light source set installed on the circuit board, and an optical element. The optical element comprises a first plane, a second plane paralleling the first plane, wherein a distance between the second plane and the circuit board is shorter than a distance between the first plane and the circuit board, a first total reflection plane between the first plane and the second plane, for totally reflecting light provided by the light source set, and a second total reflection plane between the first plane and the second plane, for totally reflecting reflected light of the first total reflection plane to the linear sensor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
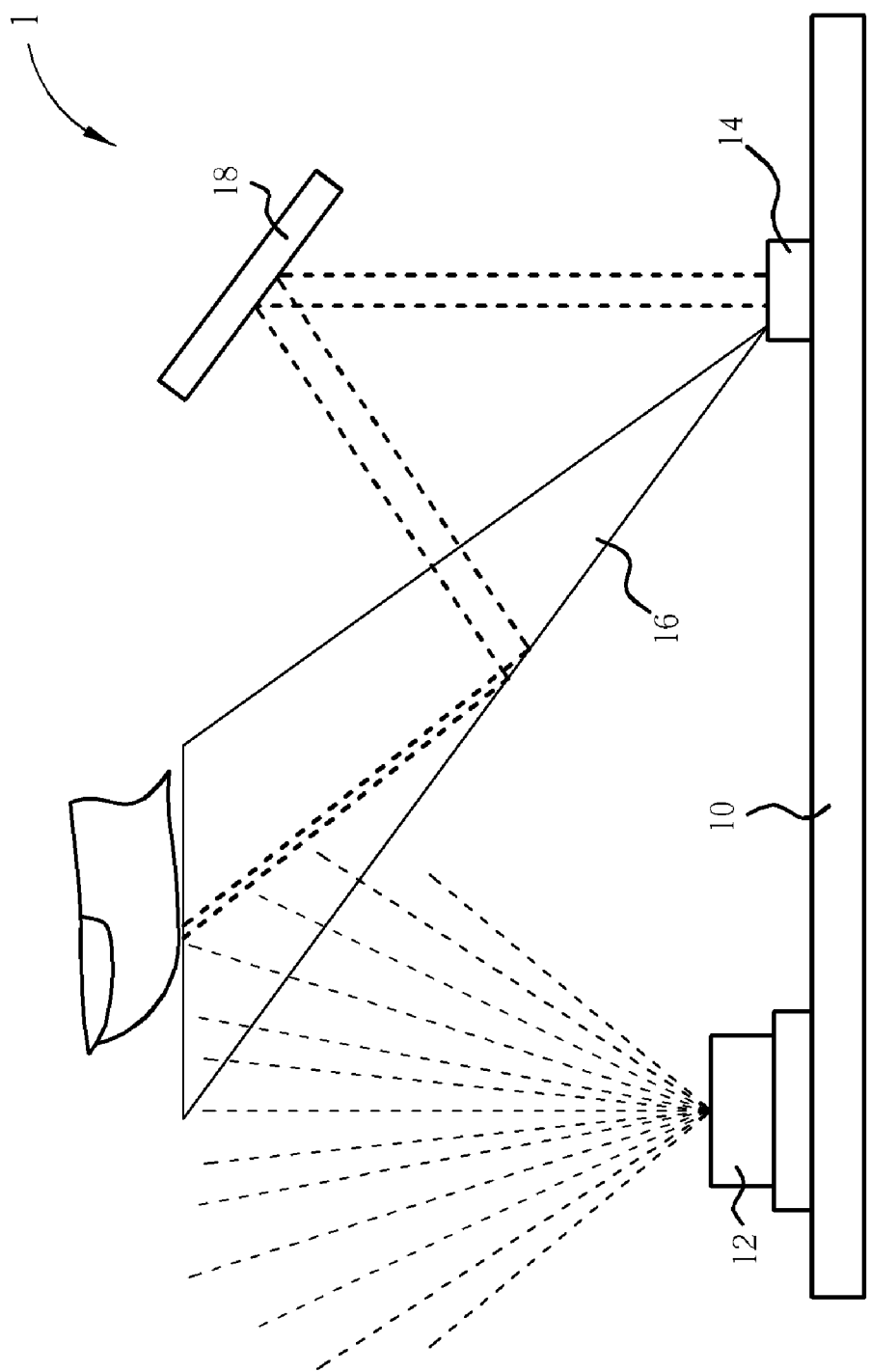
FIG. 1 illustrates a schematic diagram of a prior art optical module of a fingerprint identification system.
Figure 2:
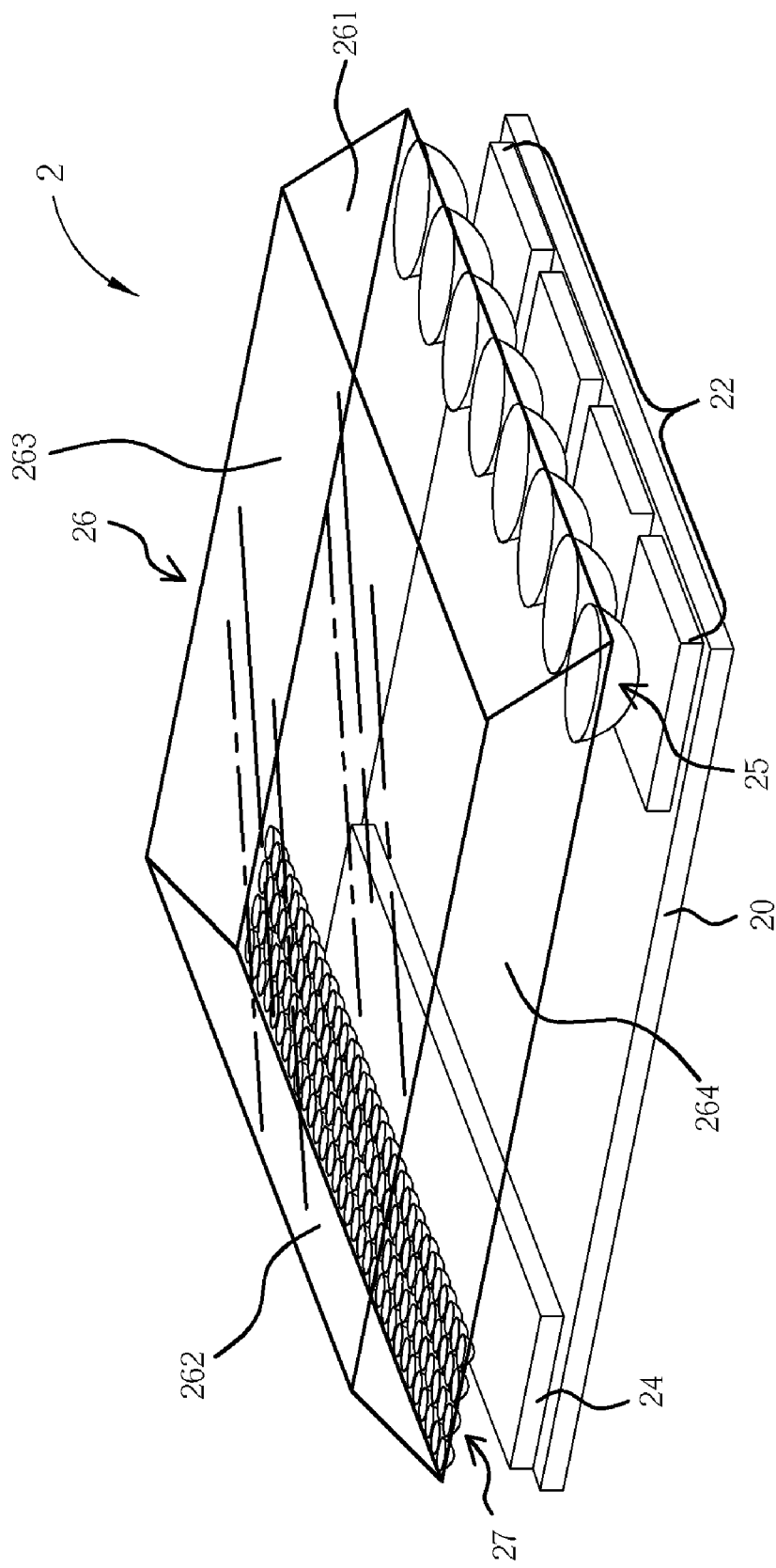
FIG. 2 illustrates a schematic diagram of an optical module for identifying images in accordance with an embodiment of the present invention.

Please refer to FIG. 2, which illustrates a schematic diagram of an optical module 2 for identifying images in accordance with an embodiment of the present invention. The optical module 2 includes a circuit board 20, a linear sensor 24, a light source set 22, and an optical element 26. The linear sensor 24 and the light source set 22 are installed on the circuit board 20. The light source set 22 parallels the linear sensor 24, and can be a plurality of dot light sources, such as light emitting diodes, or line light sources, such as lamps, or coherent light sources, such as laser diodes.

The optical element 26 includes a first plane 263, a second plane 264, a first total reflection plane 261, and a second total reflection plane 262. The first plane 263 parallels the second plane 264. The optical element 26 further includes a plurality of first lenses 25 and second lenses 27, installed on the second plane 264 and corresponding to the light source set 22 and the linear sensor 24. The optical element 26, the first lenses 25, and the second lenses 27 are formed in one shape, or monolithically formed.

Figure 3:
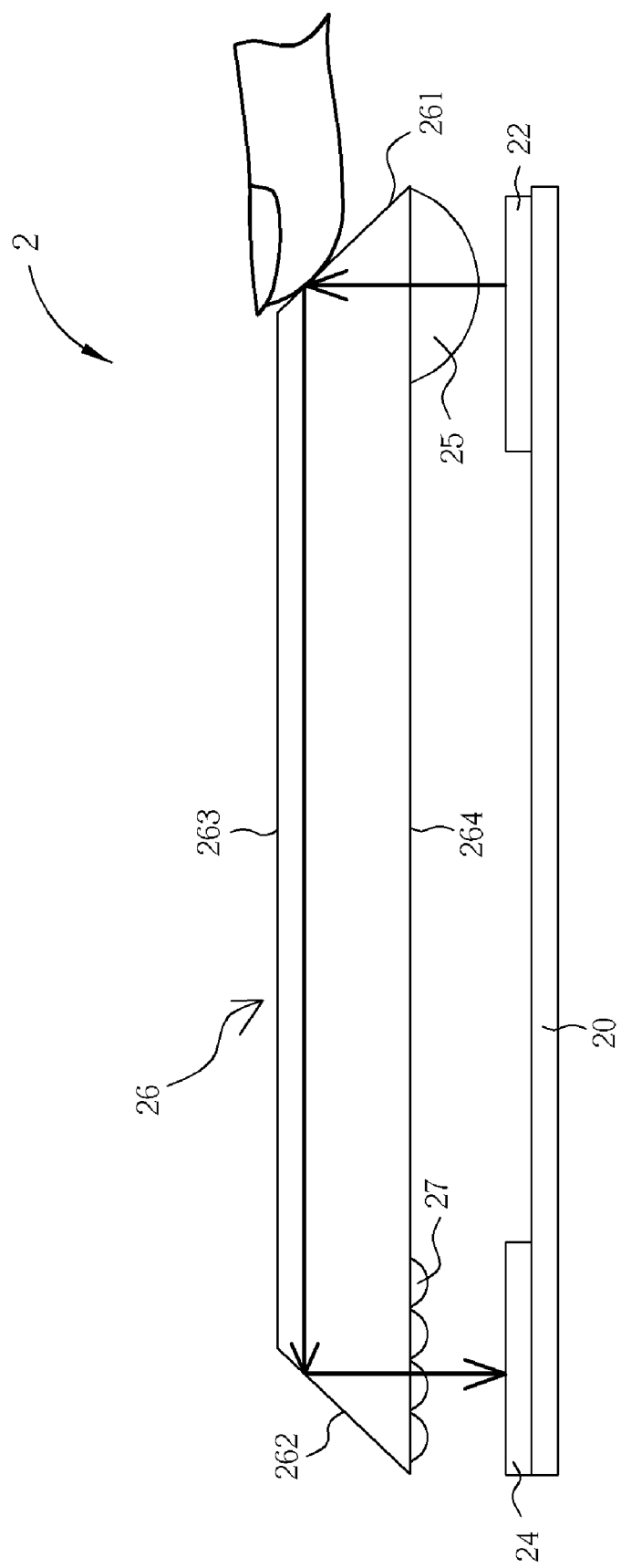
FIG. 3 illustrates a lateral view diagram of the optical module shown in FIG. 2.

Please refer to FIG. 3, which illustrates a lateral view diagram of the optical module 2 shown in FIG. 2. The light source set 22 emits light, the first lenses 25 converge light to the first total reflection plane 261, and the first total reflection plane 261 totally reflects light to the second total reflection plane 262. If a finger contacts the first total reflection plane 261, the first total reflection plane 261 will capture a fingerprint of the finger. Finally, the second lenses 27 converges light reflected from the second total reflection plane 262 to the linear sensor 24, so as to sense the fingerprint.

Since the first plane 263 parallels the second plane 264, an included angle between the first total reflection plane 261 and the second plane 264 equals an included angle between the second total reflection plane 262 and the second plane 264. The included angles are total reflection angles.

The first lenses 25 and the second lenses 27 can be eliminated in the present invention, while light condensing effect and image resolution are poor. Other than fingerprint identification systems, the present invention can be applied to different image capturing systems.

Figure 4:
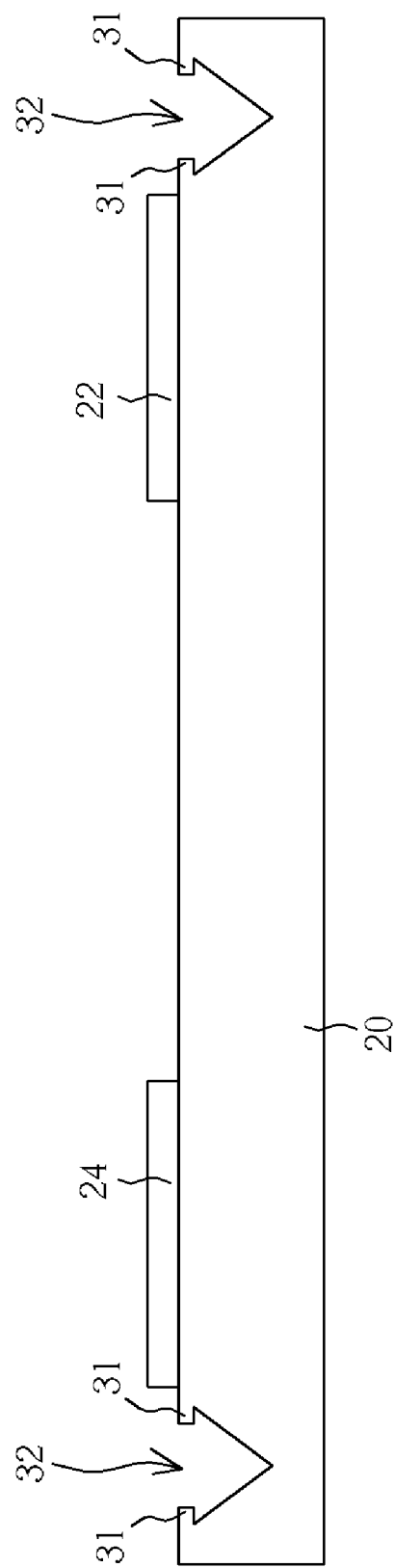
FIG. 4 to FIG. 6 illustrate configuration diagrams of the optical module shown in FIG. 2.
Figure 5:
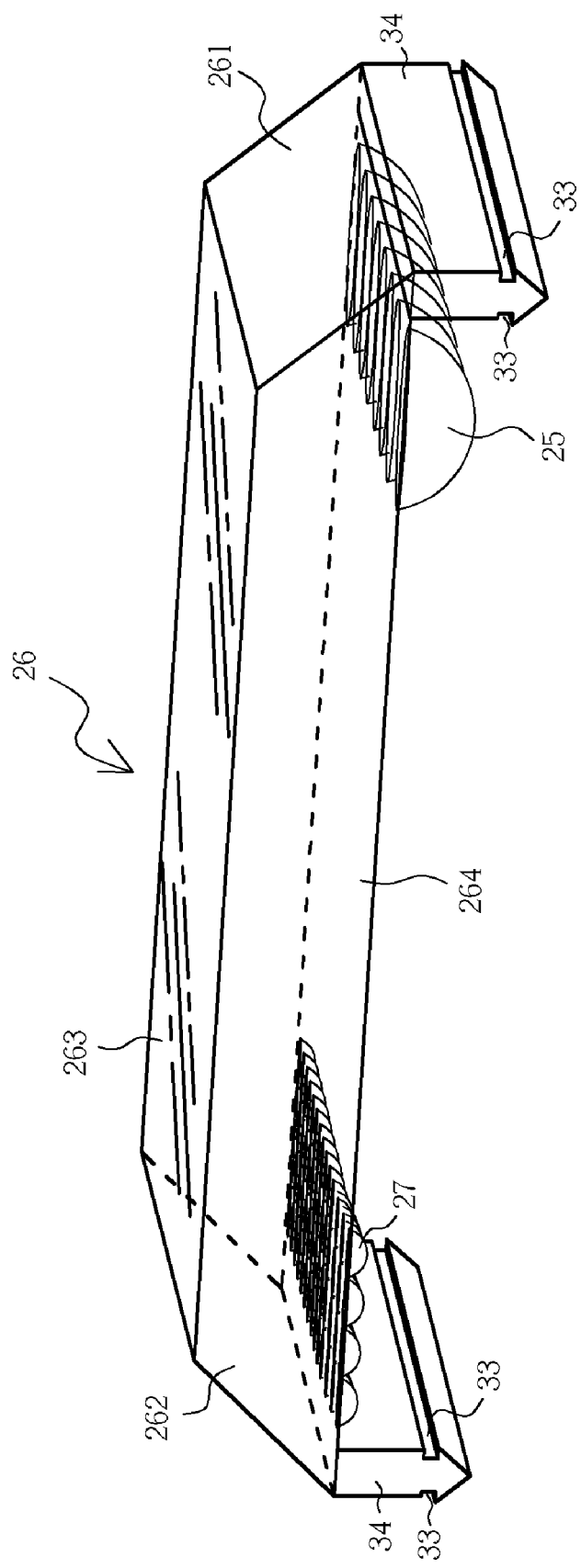

As to fabrication of the optical module 2, please refer to FIG. 4 and FIG. 5. FIG. 4 illustrates a lateral view diagram of the circuit board 20 shown in FIG. 2, while FIG. 5 illustrates a lateral view diagram of the optical element 26 shown in FIG. 2. The circuit board 20 includes two slots 32, installed near the linear sensor 24 and the light source set 22 respectively. The slots 32 include protruding ribs 31. The optical element 26 further includes two headed stubs 34, which include slots 33 and are installed near the first lens 25 and the second lens 27 respectively. Since the protruding ribs 31 in the circuit board 20 are flexible, the headed stubs 34 can be wedged into the slots 32 to finish the fabrication of the optical module 2.

Figure 6:
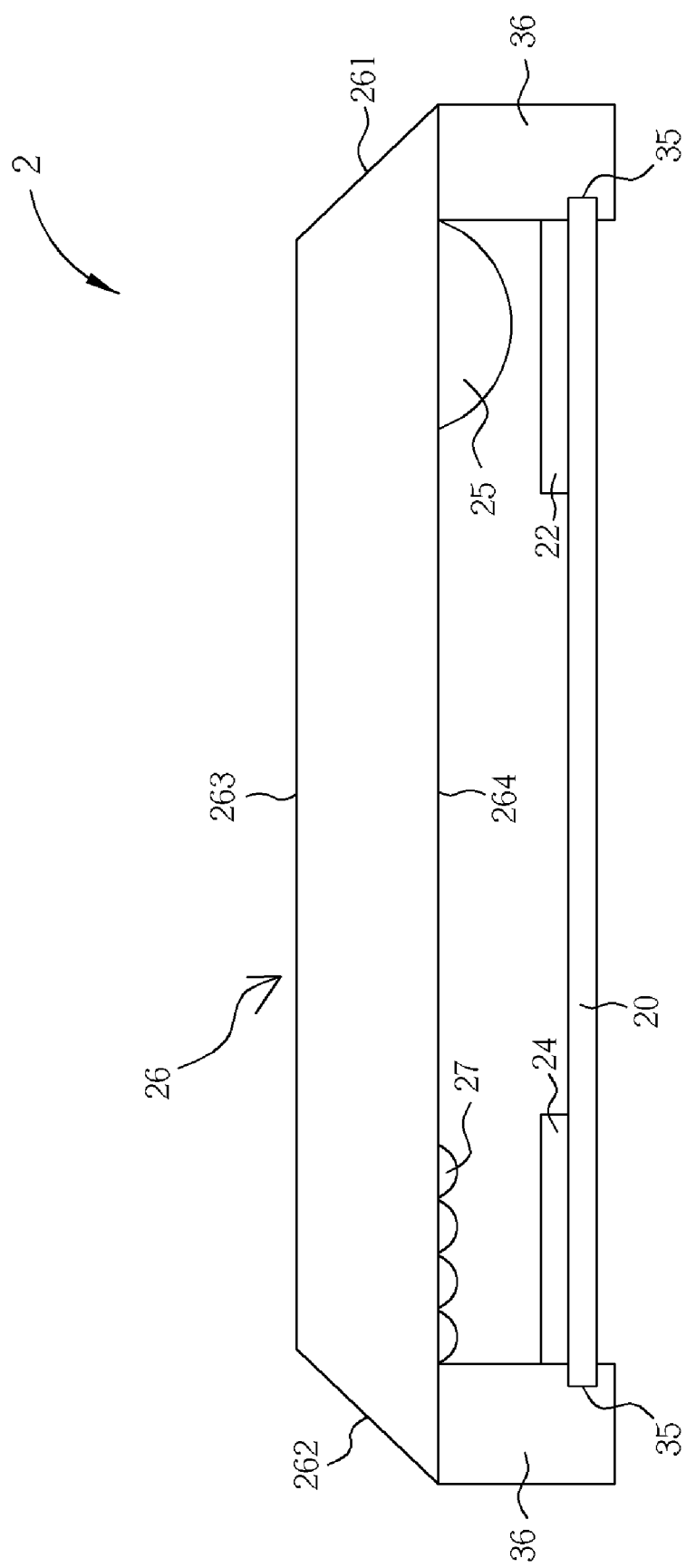

Please refer to FIG. 6, which illustrates a schematic diagram of another fabrication way of the optical module 2. Widths of fillisters 35 in headed stubs 36 equal thickness of the circuit board 20, so that the circuit board 20 can be installed in the fillisters 35 of the headed stub 36.

The present invention optical module uses single optical element and linear sensor to facilitate fabrication and decrease volume. Therefore, the present invention is suitable for small electronic device, such as mobile phones. Moreover, the lenses on the optical element can enhance light convergence and image resolution.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical module using a linear sensor for identifying images comprising:
   a circuit board comprising a slot;
   a linear sensor installed on the circuit board;
   a light source set installed on the circuit board; and
   an optical element comprising:
      a first plane;
      a second plane paralleling the first plane, wherein a distance between the second plane and the circuit board is shorter than a distance between the first plane and the circuit board;
      a first total reflection plane between the first plane and the second plane, for totally reflecting light provided by the light source set;
      a second total reflection plane between the first plane and the second plane, for totally reflecting reflected light of the first total reflection plane to the linear sensor;
      a first lens installed on the second plane and corresponding to the light source set, for focusing lights of the light source set on the first total reflection plane;
      a second lens installed on the second plane and corresponding to the linear sensor, for focusing lights totally reflected by the second total reflection plane on the linear sensor; and
      a headed stub for wedging into the slot of the circuit board.

2. The optical module of claim 1, wherein the first lens, the second lens, and the optical element are formed in one shape.

3. The optical module of claim 1, wherein the headed stub is installed on a side of the optical element near the first lens.

4. The optical module of claim 1, wherein the headed stub is installed on a side of the optical element near the second lens.

5. The optical module of claim 1 further comprising a second lens installed on the second plane and corresponding to the linear sensor, for focusing lights totally reflected by the second total reflection plane on the linear sensor.

6. The optical module of claim 1, wherein an angle between the first total reflection plane and the second plane is a total-reflection angle.

7. The optical module of claim 1, wherein an angle between the second total reflection plane and the second plane is a total-reflection angle.

8. The optical module of claim 1, wherein the light source set comprises a plurality of light sources parallel with the linear sensor.

9. The optical module of claim 8, wherein the plurality of light sources are a plurality of light emitting diodes.

10. The optical module of claim 8, wherein the plurality of light sources are a plurality of laser diodes.

11. The optical module of claim 1, wherein the light source set comprises a line light source parallel with the linear sensor.

12. The optical module of claim 11, wherein the line light source is a lamp tube.

13. An optical module using a linear sensor for identifying images comprising:
    a circuit board comprising a slot;
    a linear sensor installed on the circuit board;
    a light source set installed on the circuit board; and
    an optical element comprising:
       a first plane;
       a second plane paralleling the first plane, wherein a distance between the second plane and the circuit board is shorter than a distance between the first plane and the circuit board;
       a first total reflection plane between the first plane and the second plane, for totally reflecting light provided by the light source set;
       a second total reflection plane between the first plane and the second plane, for totally reflecting reflected light of the first total reflection plane to the linear sensor; and
       a headed stub for wedging into the slot of the circuit board.

14. An optical module using a linear sensor for identifying images comprising:
    a circuit board;
    a linear sensor installed on the circuit board;
    a light source set installed on the circuit board; and
    an optical element comprising:
       a first plane;
       a second plane paralleling the first plane, wherein a distance between the second plane and the circuit board is shorter than a distance between the first plane and the circuit board;
       a first total reflection plane between the first plane and the second plane, for totally reflecting light provided by the light source set;
       a second total reflection plane between the first plane and the second plane, for totally reflecting reflected light of the first total reflection plane to the linear sensor; and
       two headed stubs each comprising a fillister, wherein the circuit board is installed on the fillisters of the two headed stubs.

* * * * *